United States Patent
Cheng (10) Patent No.: US 10,886,731 B2
(45) Date of Patent: Jan. 5, 2021

(54) OVER-VOLTAGE PROTECTION CIRCUIT FOR USB TYPE-C CONNECTOR

(71) Applicants: VOLTRON MICROELECTRONICS CORP., Zhubei (TW); UPI SEMICONDUCTOR CORP., Zhubei (TW)

(72) Inventor: Chun-Yi Cheng, Zhubei (TW)

(73) Assignees: VOLTRON MICROELECTRONICS CORP., Zhubei (TW); UPI SEMICONDUCTOR CORP., Zhubei (TW)

( * ) Notice: Subject to any disclaimer, the term of this patent is extended or adjusted under 35 U.S.C. 154(b) by 24 days.

(21) Appl. No.: 16/548,998

(22) Filed: Aug. 23, 2019

(65) Prior Publication Data

US 2020/0373756 A1    Nov. 26, 2020

(30) Foreign Application Priority Data

May 23, 2019    (TW) .............................. 108117846 A (51) Int. Cl.
*H02H 9/04* (2006.01)
*H01R 24/60* (2011.01)

(52) U.S. Cl.
CPC .............. *H02H 9/045* (2013.01); *H01R 24/60* (2013.01); *H02H 9/04* (2013.01); *H02H 9/043* (2013.01); *H02H 9/046* (2013.01); *H02H 9/048* (2013.01)

(58) Field of Classification Search
CPC .......... H02H 9/04; H02H 9/043; H02H 9/046; H02H 9/048

USPC .......................................... 361/86, 91.1, 91.7
See application file for complete search history.

(56) References Cited

U.S. PATENT DOCUMENTS

| | | | | |
|---|---|---|---|---|
| 2014/0268462 A1* | 9/2014 | Mikolajczak | ............ | H02H 9/04 361/91.1 |
| 2015/0022170 A1* | 1/2015 | Chen | ..................... | H02M 3/158 323/282 |
| 2015/0098160 A1* | 4/2015 | Gao | ..................... | H03K 17/102 361/86 |
| 2017/0344098 A1* | 11/2017 | Abu Hilal | ............ | G06F 13/4282 |
| 2017/0346240 A1* | 11/2017 | Oporta | ................... | H01R 24/60 |

* cited by examiner

*Primary Examiner* — Gary A Nash
(74) *Attorney, Agent, or Firm* — Schmeiser, Olsen & Watts, LLP (57) ABSTRACT

The present application proposes an over-voltage protection circuit for a USB Type-C connector. The USB Type-C connector has at least one input signal pin. The over-voltage protection circuit includes a control circuit, a voltage level shift circuit, and a system clamping circuit. The control circuit generates a control signal according to a bias voltage. The voltage level shift circuit is electrically connected to the at least one input signal pin and the control circuit, and arranged to receive the control signal and at least one input signal and the control signal from the at least one input signal pin, and regulate a voltage level of the at least one input signal according to the control signal. The system clamping circuit is electrically connected to the level shift circuit, and clamps the voltage level of the regulated input signal down to below a threshold.

6 Claims, 6 Drawing Sheets

OVER-VOLTAGE PROTECTION CIRCUIT FOR USB TYPE-C CONNECTOR

CROSS-REFERENCE TO RELATED APPLICATION

This non-provisional application claims priority under 35 U.S.C. § 119(a) on Patent Application No(s). 108117846 filed in Taiwan, R.O.C. on May 23, 2019, the entire contents of which are hereby incorporated by reference.

BACKGROUND OF THE INVENTION

1. Field of the Invention

The present disclosure relates to over-voltage protection circuits, and in particular to an over-voltage protection circuit for a USB Type-C connector.

2. Description of the Related Art

USB Type-C connectors surpass conventional USB connectors in terms of specifications. However, in practice, USB Type-C connectors still pose potential risks, and the most dangerous one is: a high chance of developing a short circuit between pins.

The USB Type-C connector is small-sized and comprises densely distributed pins, with a short pin-to-pin distance, i.e., 0.5 mm. The pin-to-pin distance of the USB Type-C connector is only 20% that of a USB Type-A connector. Owing to the short pin-to-pin distance of the USB Type-C connector, an instantaneous short circuit is likely to develop between adjacent pins in the course of the plugging and unplugging of the USB Type-C connector.

Figure 1:
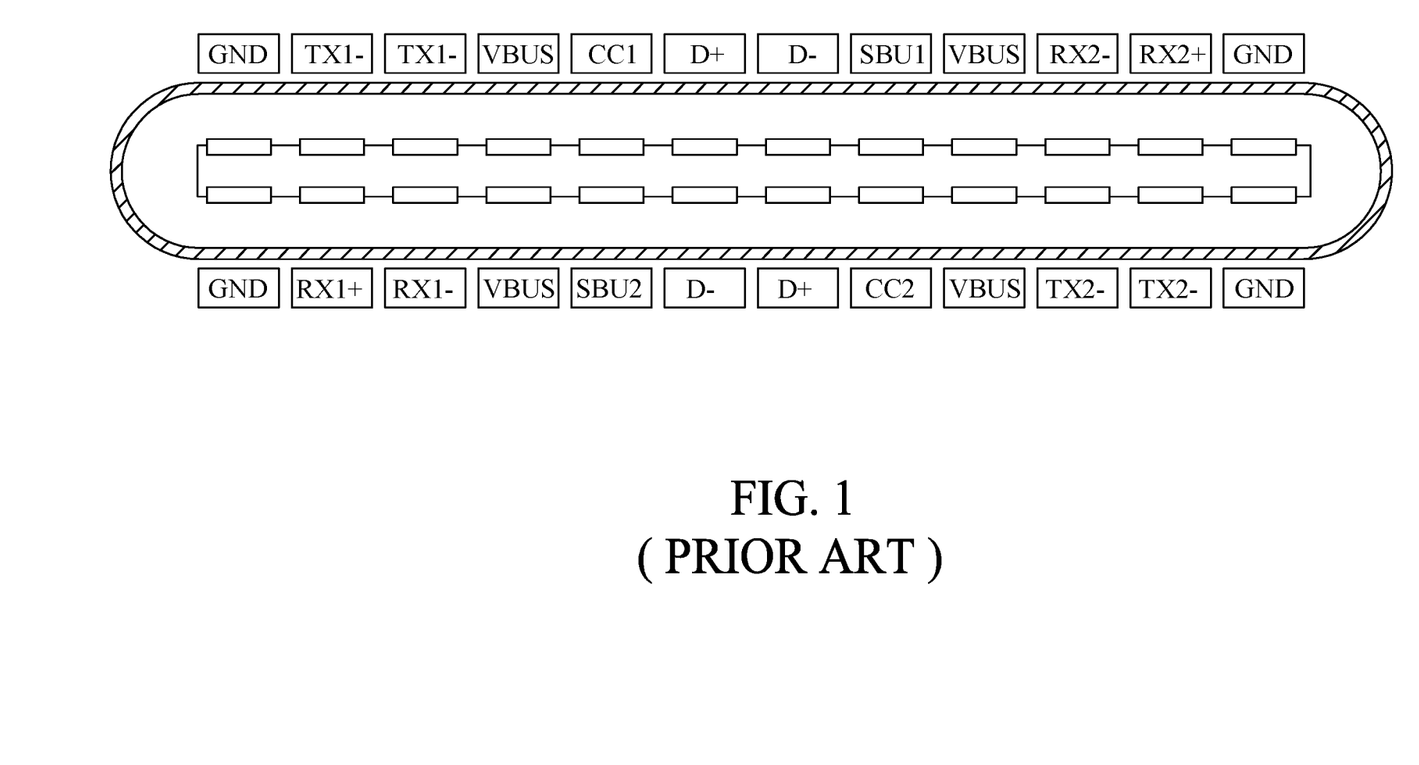
FIG. 1 (PRIOR ART) is a cross-sectional view of a conventional USB Type-C connector.

Referring to FIG. 1, FIG. 1 is a cross-sectional view of a conventional USB Type-C connector. As shown in FIG. 1, in the USB Type-C connector, the pins CC1, CC2, SBU1, SBU2 adjacent to the VBUS pin with PD function are especially likely to develop a short circuit as mentioned above. In a laboratory, the short circuit is especially likely to occur in a repeatedly plugging & unplugging test.

In another situation, pins which have aged are predisposed to deformation when hit. Owing to its short pin-to-pin distance, the USB Type-C connector is likely to develop a short circuit between the VBUS pin and an adjacent pin, and thus a high-voltage enters an internal electronic system, causing damage to electronic components.

In yet another situation, to cut cost, internal wirings of some low-end power adaptors do not meet Type-C compatibility requirement. For instance, the VBUS pin in the internal wirings of the adaptors is already connected to an adjacent pin (CC1 or CC2), or a boosted voltage is directly short-circuited to the VBUS pin rather than coupled to the VBUS pin through a voltage step-down circuit (such as a linear dropout, LDO). If the power adaptor is connected to another device, for example, a device which provides only 5V support to pin CC, the device may be damaged.

It is necessary to provide an over-voltage protection circuit for a USB Type-C connector with a view to preventing pins in internal circuits of a device form short-circuiting and thus causing high-voltage damage to the device, so as to lower the chance of system damage.

BRIEF SUMMARY OF THE INVENTION

Every embodiment of the present disclosure is directed to an over-voltage protection circuit for use with a USB Type-C connector, but the over-voltage protection circuit can only support low-voltage (say, 5V) pins.

An embodiment of the present disclosure provides an over-voltage protection circuit for a USB Type-C connector. The USB Type-C connector has at least one input signal pin. The over-voltage protection circuit comprises a control circuit, a voltage level shift circuit and a system clamping circuit. The control circuit generates a control signal according to a bias signal. The voltage level shift circuit is electrically connected to at least one input signal pin and the control circuit to receive the control signal and the input signal from at least one input signal pin and regulate the voltage level of the input signal according to the control signal. The system clamping circuit is electrically connected to the voltage level shift circuit to receive the regulated input signal and clamp down the voltage level of the regulated input signal to below a threshold.

According to the above embodiments, the control circuit further comprises a charge pump coupled to the voltage level shift circuit to receive the bias signal and output the control signal according to the bias signal.

According to any one of the above embodiments, the voltage level shift circuit further comprises at least one NMOS transistor each having a gate terminal, a drain terminal and a source terminal. The gate terminal is coupled to the control circuit to receive the control signal. The drain terminal is electrically connected to one of the at least one input signal pin, with the input signal pin corresponding to the input signal, to receive the input signal. The source terminal is electrically connected to the system clamping circuit.

According to any one of the above embodiments, the voltage level shift circuit comprises at least one pair of NMOS transistors each having a first NMOS transistor and a second NMOS transistor. The first NMOS transistor has a first gate terminal, a first drain terminal and a first source terminal. The second NMOS transistor has a second gate terminal, a second drain terminal and a second source terminal. The first gate terminal and the second gate terminal are coupled to the control circuit to receive the control signal. The first drain terminal is electrically connected to one of the at least one input signal pin, with the input signal pin corresponding to the input signal, to receive the input signal. The first source terminal is connected to the second source terminal in series. The second drain terminal is electrically connected to the system clamping circuit.

According to any one of the above embodiments, the system clamping circuit further comprises a first Zener diode, at least one first diode and second diode. The first Zener diode has an anode and a cathode. The anode of the first Zener diode is grounded. Each of the at least one first diode has an anode and a cathode. The anode of the at least one first diode is electrically connected to the source terminal of at least one NMOS transistor. The cathode of the at least one first diode is electrically connected to the cathode of the first Zener diode. The second diode has an anode and a cathode. The anode of the second diode is electrically connected to the charge pump. The cathode of the second diode is electrically connected to the cathode of the first Zener diode.

According to any one of the above embodiments, the system clamping circuit further comprises a second Zener diode which has an anode and a cathode. The cathode of the second Zener diode is electrically connected to the cathode of the second diode. The anode of the second Zener diode is electrically connected to ground through a capacitor. The first Zener diode and the second Zener diode have different reverse breakdown voltages.

In conclusion, according to the present disclosure, an over-voltage protection circuit for a USB Type-C connector clamps down a high voltage to below a threshold as soon as an input signal pin of the USB Type-C connector short-circuits to generate the high voltage, so as to protect internal circuits connected to the input signal pin against damage otherwise caused by the high voltage.

DETAILED DESCRIPTION OF THE INVETION

To facilitate understanding of the object, characteristics and effects of this present disclosure, embodiments together with the attached drawings for the detailed description of the present disclosure are provided.

Terms used herein are solely intended to illustrate embodiments of the present disclosure rather than restrict the present disclosure. Singular nouns used herein are intended to include their plural forms, unless otherwise specified. The terms "comprise" and "include" used herein indicate the presence of related technical features but do not rule out the presence or inclusion of one or more other technical features not mentioned. The expression "and/or" used herein indicates any or all combinations of one or more related solutions. The terms "connect" and "couple" used herein mean that the related element is not only directly coupled to another element but also indirectly coupled to another element through an intermediate element.

Although elements described herein are preceded by the terms "first", "second" and "third", the elements are not restricted thereto. In this regard, the terms "first", "second" and "third" distinguish the elements from each other. Therefore, the first element can be interpreted to mean the second element or the third element, without departing from the spirit and scope of the present disclosure.

The accompanying drawings are not drawn to scale. Moreover, in some circumstances, the scale can be exaggerated in order to illustrate the embodiments of the present disclosure clearly.

Figure 2:
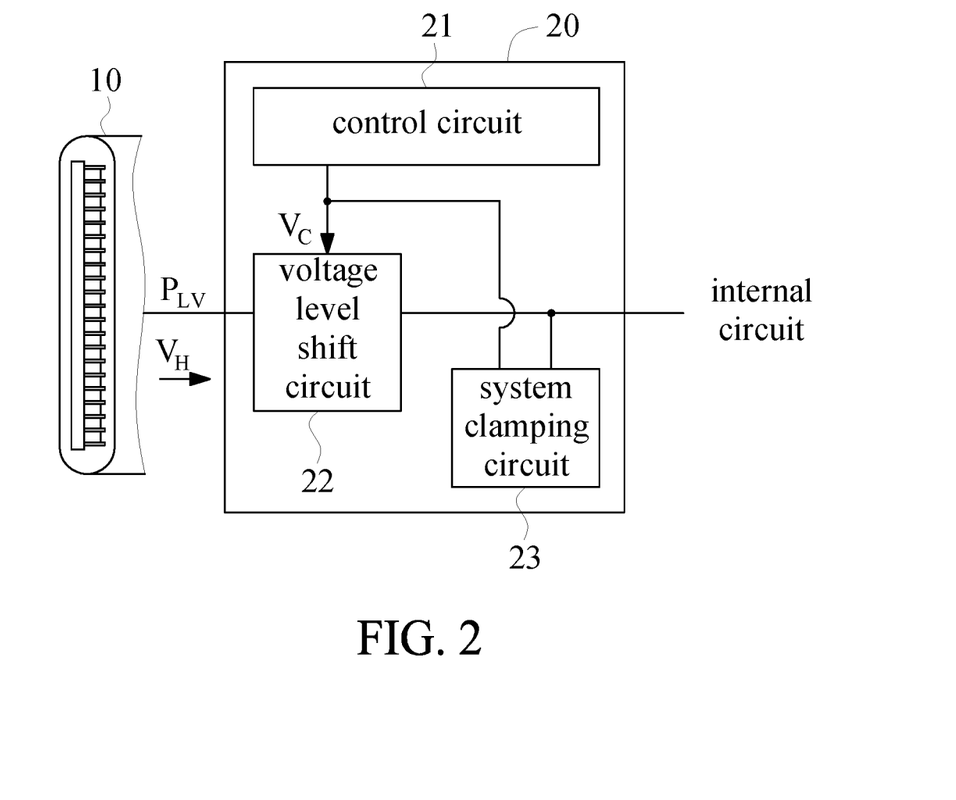
FIG. 2 is a block diagram of an over-voltage protection circuit for a USB Type-C connector according to an embodiment of the present disclosure.

FIG. 2 is a block diagram of an over-voltage protection circuit for a USB Type-C connector according to an embodiment of the present disclosure.

Referring to FIG. 2, an over-voltage protection circuit 20 for a USB Type-C connector 10 is provided. The USB type C connector 10 comprises input signal pins, some of which can only support application of low voltage levels, for example, pins CC1, CC2, SBU1, SBU2. The over-voltage protection circuit 20 is adapted to be series-connected to the pins to provide over-voltage protection thereto. The pins CC1, CC2, SBU1, SBU2 are physically proximate to the high voltage level VBUS pin with PD function and thus are likely to develop a short circuit with the VBUS pin, thereby causing damage to internal circuits, but the present disclosure is not limited thereto. Any other pins which support low voltage levels only also benefit from the present disclosure. For the sake of illustration, FIG. 2 only shows those pins which support low voltage levels. In another aspect, after referring to the present disclosure, persons skilled in the art can think of a variant embodiment where pins are coupled together (for example, connecting two pins in series) without departing from the spirit and scope of the present disclosure, and the variant embodiment is deemed falling within the scope of the present disclosure.

Referring to FIG. 2, the over-voltage protection circuit 20 comprises a control circuit 21, a voltage level shift circuit 22 and a system clamping circuit 23. The voltage level shift circuit 22 is electrically connected to an intended input signal pin PLV (for example, CC1, CC2, SBU1 and/or SBU2). When a short circuit develops between pin PLV and VBUS, high voltage signal VH is sent to the voltage level shift circuit 22 through pin PLV such that the voltage level shift circuit 22 steps down (shifts) the high voltage signal VH to a low voltage level (approximate to the input signal level of input signal pin PLV) according to control signal VC from the control circuit 21. Hence, the voltage level shift circuit 22 effectively stops any high-voltage current from entering the internal circuits but allows the input signal to enter the internal circuits. In another aspect, after the high voltage signal VH has passed through the voltage level shift circuit 22, the instantaneous, enormous stepping up of the voltage level instantaneously steps up the voltage level of NMOS gate (MG) because of charge coupling, thereby causing a high-level voltage to reach a source terminal instantaneously. This voltage level is overly high to the internal circuits, thereby increasing the chance of causing damage to the internal circuits. In this regard, the system clamping circuit 23 is effective in clamping down the overly high voltage signal to a predetermined threshold. Therefore, if internal circuits are coupled to the pin PLV through the over-voltage protection circuit 20, they will be fully protected.

Figure 3:
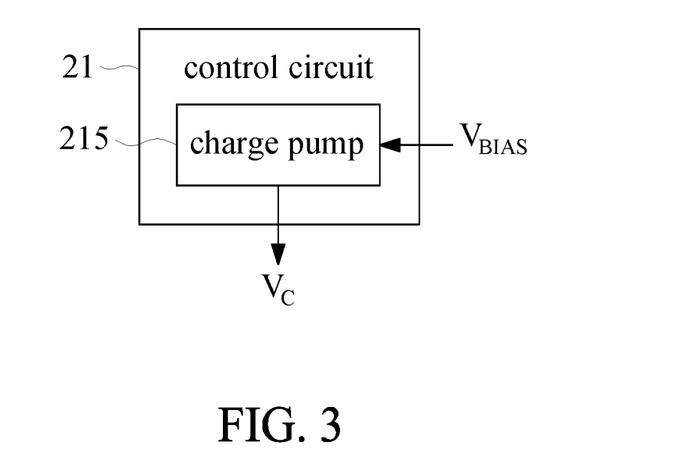
FIG. 3 is a block diagram of the control circuit in FIG. 2 according to an embodiment of the present disclosure.

Referring to FIG. 3, FIG. 3 is a block diagram of the control circuit in FIG. 2 according to an embodiment of the present disclosure. As shown in FIG. 3, the control circuit 21 comprises a charge pump 215. The charge pump 215 generates control signal VC according to a bias signal VBIAS. In a preferred embodiment, the bias signal VBIAS is the input signal of the charge pump 215, whereas the control signal VC is the output signal of the charge pump 215. Hence, the charge pump 215 uses the bias signal VBIAS to step up a specific voltage level by predetermined times such that it functions as the control signal VC to be output to the voltage level shift circuit 22, allowing the voltage level shift circuit 22 to adjust the level of the passing voltage signal according to the control signal VC.

Figure 4A:
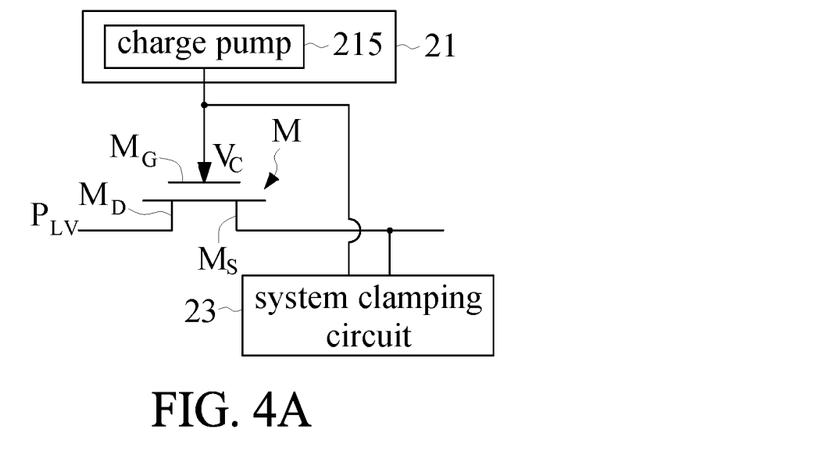
FIG. 4A is a circuit diagram of the voltage level shift circuit in FIG. 2 in a different embodiment.

Referring to FIG. 4A, FIG. 4A is a circuit diagram of the voltage level shift circuit in FIG. 2 according to an embodiment of the present disclosure. In this embodiment, the voltage level shift circuit 22 comprises NMOS transistor M. The NMOS transistor M has gate terminal MG, drain terminal MD and source terminal MS. The gate terminal MG is electrically connected to the output of the charge pump 215 to receive control signal VC. The drain terminal MD is electrically connected to the input signal pin PLV to receive the input signal from the input signal pin PLV. The source terminal MS is electrically connected to the system clamping circuit 23 to output the high voltage signal regulated with the voltage level shift circuit 22 to the system clamping circuit 23. The NMOS transistor of the present disclosure is at the very least able to bear a voltage of 5V-20V in order to effectively stop the high voltage signal from entering the internal circuits.

If the control circuit 21 controls and outputs the control signal VC sufficiently high such that the voltage difference VGS between the gate terminal MG and source terminal MS of the NMOS transistor M is higher than the critical voltage of the NMOS transistor M, the NMOS transistor M will operate within the saturated region. If a short circuit develops between the input signal pin PLV and the VBUS pin, the high voltage signal VH enters drain MD. As drain MD voltage rises beyond gate MG voltage, inversion charge near drain MD becomes zero, leading to the demise of channel at this point. In this situation, carriers from the source MS reach a clamping point via the channel so as to be introduced into a space charge region surrounding the drain MD and then into the drain MD in the presence an electric field. From now on, the current passing through NMOS transistor M has nothing to do with the voltage VDS between the drain MD and the source MS but is relevant to the gate MG voltage only. It is because the gate MG voltage proximate to the drain MD is no longer sufficient to permit inversion of the channel; this places a limitation on the quantity of the carriers reaching the channel and thus magnitude of the current at the channel, thereby limiting the voltage output from the source MS. Hence, the voltage output from the source MS can be controlled by controlling the gate MG voltage to attain voltage regulation (shifting). Furthermore, if the drain terminal MD generates a high voltage signal suddenly, the voltage of the control signal VC will increase instantaneously because of charge coupling; as a result, the control signal VC gets out of control, and in consequence transistor M cannot be controlled to operate within the saturated region. For this reason, the control signal VC must be coupled to the system clamping circuit 23 to preclude excessive influence of charge coupling on the control signal VC. Therefore, even if the voltage of the control signal VC increases because of the charge coupling produced by the high voltage of the drain terminal MD, the system clamping circuit 23 will regulate and thus clamp down the voltage to below a predetermined level.

Figure 4B:
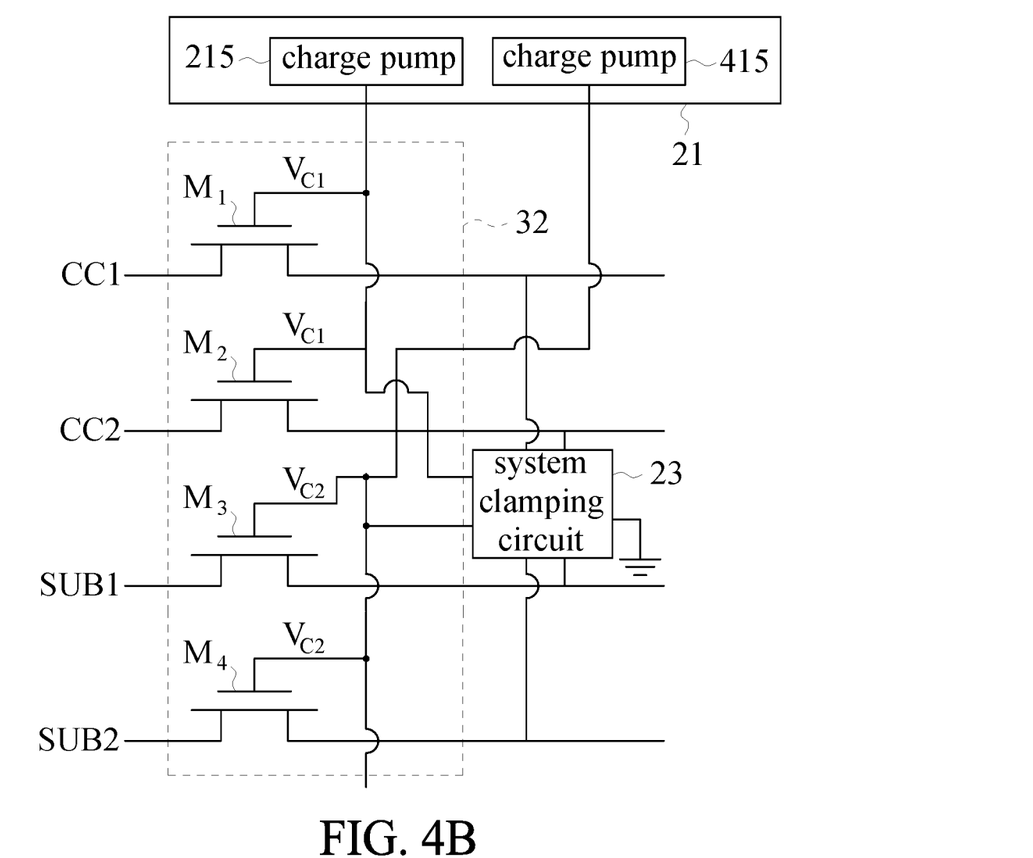
FIG. 4B is a circuit diagram of the voltage level shift circuit in FIG. 2 in another different embodiment.

In this embodiment, the over-voltage protection provided to an input pin requires that a corresponding NMOS transistor be provided in the voltage level shift circuit 22, but the present disclosure is not limited thereto. Referring to FIG. 4B, in a variant aspect, the voltage level shift circuit 32 comprises four NMOS transistors M1~M4 each connected to one input pin (for example, CC1, CC2, SUB1 and SUB2). As shown in FIG. 4A, in the voltage level shift circuit 32, drains of transistors M1, M2, M3, M4 are connected to input pins CC1, CC2, SUB1, SUB2, respectively, to provide over-voltage protection to input pins CC1, CC2, SUB1, SUB2, respectively. Input pins CC1, CC2 and SUB1, SUB2 need different levels of the control signal, and thus the control circuit 21 in this embodiment further comprises a charge pump 415. The charge pump 215 outputs control signal VC1 to control transistors M1, M2. The charge pump 415 outputs control signal VC2 to control transistors M3, M4. Gates of transistors M1, M2, M3, M4 are coupled to the charge pump 215 and the charge pump 415 to receive control signals VC1~C2, respectively. Sources of transistors M1, M2, M3, M4 are signal paths connected to internal circuits, respectively. The system clamping circuit 23 is parallel-connected between the ground and the signal paths, respectively, to ensure that the voltage of signals input to the internal circuits can be clamped down to a predetermined level so as to protect the internal circuits against damage otherwise caused by high voltage. The voltage level shift circuit 32 is similar to the voltage level shift circuit 22 in terms of operation and control. For the sake of brevity, their identical technical features are not described hereunder. Persons skilled in the art understand how to operate the voltage level shift circuit 32.

Figure 4C:
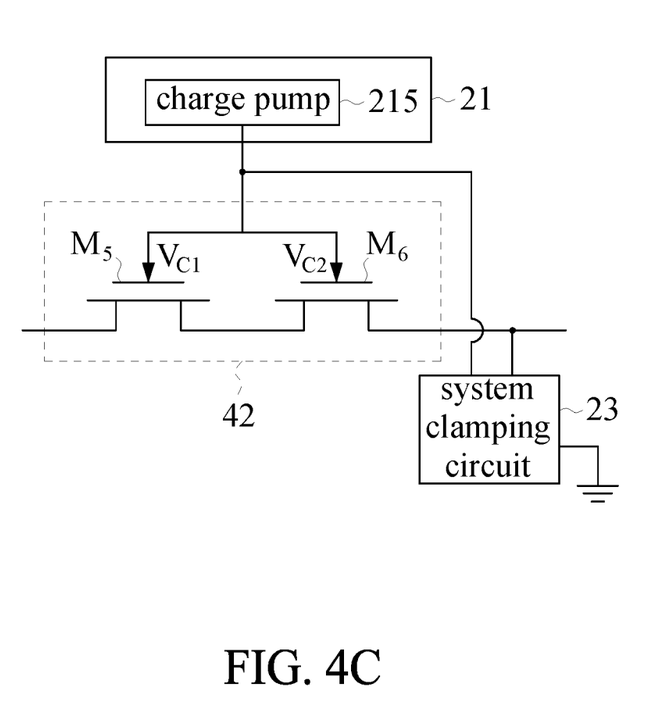
FIG. 4C is a circuit diagram of the voltage level shift circuit in FIG. 2 in yet another different embodiment.

Referring to FIG. 4C, in another variant aspect, the voltage level shift circuit 42 is not restricted to including one NMOS transistor. For example, two NMOS transistors M5, M6 are series-connected. In this embodiment, transistor M5 has its drain connected to an input pin and its source series-connected to the source of transistor M6. Gates of transistors M5, M6 are connected to the charge pump 215 to receive the control signal VC1~C2. In this embodiment, the control signal VC1 and control signal VC2 are output from the charge pump 215. In another embodiment, the control circuit 21 comprises another charge pump to output the control signal VC2. Details of the difference between the control signal VC1 and the control signal VC2 are depicted in FIG. 4B and thus, for the sake of brevity, are not presented hereunder. The drain of the transistor M6 is a signal path connected to the internal circuits. The system clamping circuit 23 is parallel-connected between the ground and the signal path to ensure that the voltage of signals input to the internal circuits can be clamped down to a predetermined level to protect the internal circuits against damage otherwise caused by high voltage. The voltage level shift circuit 42 is similar to the voltage level shift circuit 22 in terms of operation and control. For the sake of brevity, their identical technical features are not described hereunder. Persons skilled in the art understand how to operate the voltage level shift circuit 42.

Figure 5A:
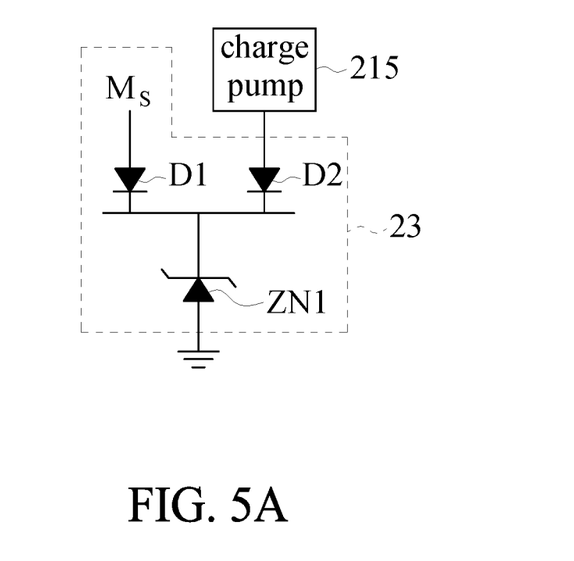
FIG. 5A is a circuit diagram of the system clamping circuit in FIG. 2 in an embodiment.

Referring to FIG. 5A, FIG. 5A is a circuit diagram of the system clamping circuit in FIG. 2 according to an embodiment of the present disclosure. As shown in FIG. 5A, the system clamping circuit 23 comprises Zener diode ZN1, diode D1 and diode D2. The Zener diode ZN1 has an anode and a cathode. The anode of the first Zener diode ZN1 is grounded. The diode D1 has an anode and a cathode. The anode of the diode D1 is electrically connected to source terminal MS of NMOS transistor M. The cathode of the diode D1 is electrically connected to the cathode of the Zener diode ZN1. The diode D2 has an anode and a cathode. The anode of the diode D2 is electrically connected to the charge pump 215. The cathode of the diode D22 is electrically connected to the cathode of the Zener diode ZN1.

If the level of the voltage signal regulated with the voltage level shift circuit 22 is stepped down with the conduction voltage of the diode D1 but is still higher than the reverse breakdown voltage of the Zener diode ZN1, the Zener diode ZN1 will undergo reverse conduction, and the voltage difference between the two terminals of the Zener diode ZN1 will be clamped down to the reverse breakdown voltage, so as to provide over-voltage protection to the internal circuits.

In this embodiment, the system clamping circuit 23 includes only one diode D1 connected to source terminal MS of NMOS transistor M, but the present disclosure is not limited thereto.

Figure 5B:
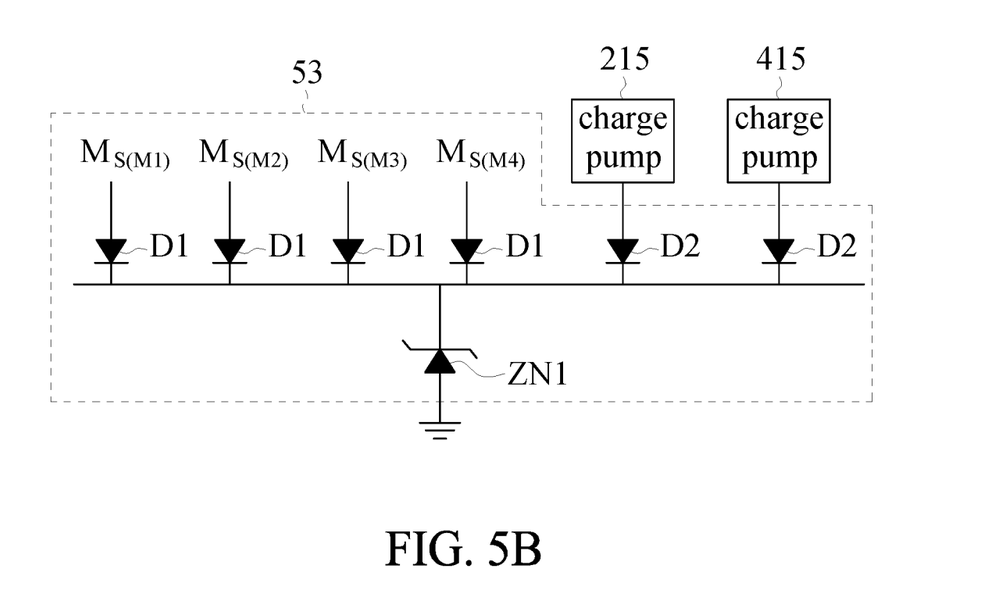
FIG. 5B is a circuit diagram of the system clamping circuit in FIG. 4B in an embodiment.

Referring to FIG. 5B, FIG. 5B is a circuit diagram of the system clamping circuit in FIG. 4B according to an embodiment of the present disclosure. The system clamping circuit 53 operates in the same way as the system clamping circuit 23 except that the system clamping circuit 53 comprises diodes D1 and diodes D2 which are connected to the control signals and the sources of NMOS transistors M, respectively, to provide over-voltage protection to input pins.

Figure 6A:
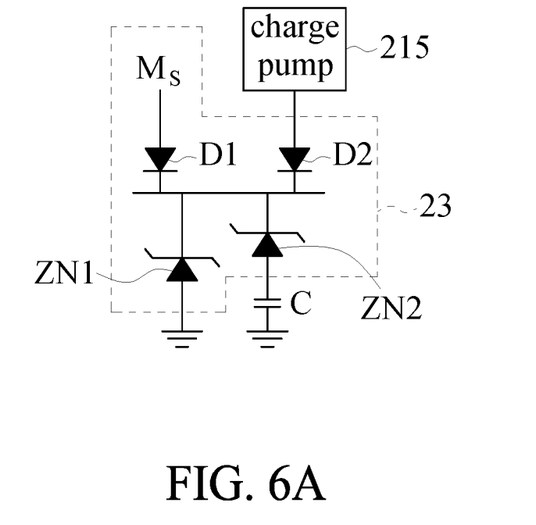
FIG. 6A is a circuit diagram of the system clamping circuit in FIG. 2 in another embodiment.

Referring to FIG. 6A, FIG. 6A is a circuit diagram of the system clamping circuit in FIG. 2 according to another embodiment of the present disclosure. The system clamping circuit 23 in FIG. 6A is the same as the system clamping circuit 23 in FIG. 5A except that the system clamping circuit 23 in FIG. 6A further comprises Zener diode ZN2. The Zener diode ZN2 has an anode and a cathode. The cathode of the Zener diode ZN2 is electrically connected to the cathode of the diode D2. The anode of the Zener diode ZN2 is electrically connected to ground through capacitor C.

The Zener diode ZN1 and Zener diode ZN2 have different reverse breakdown voltages. The Zener diode ZN2 has a low reverse breakdown voltage and thus can provide another path to a high voltage signal. If the level of voltage signal regulated with the voltage level shift circuit 22 is stepped down with the conduction voltage of the diode D1 and is still higher than the reverse breakdown voltage of the Zener diode ZN2 but is lower than the reverse breakdown voltage of the Zener diode ZN1, the Zener diode ZN2 will undergo reverse conduction to cause the high voltage signal to reach capacitor C and thus charge capacitor C, so as to reduce the voltage stepping up speed. This effectively suppresses charge coupling and thus releases the energy of the high voltage signal quickly, thereby inhibiting destructive effect of the high voltage signal.

Figure 6B:
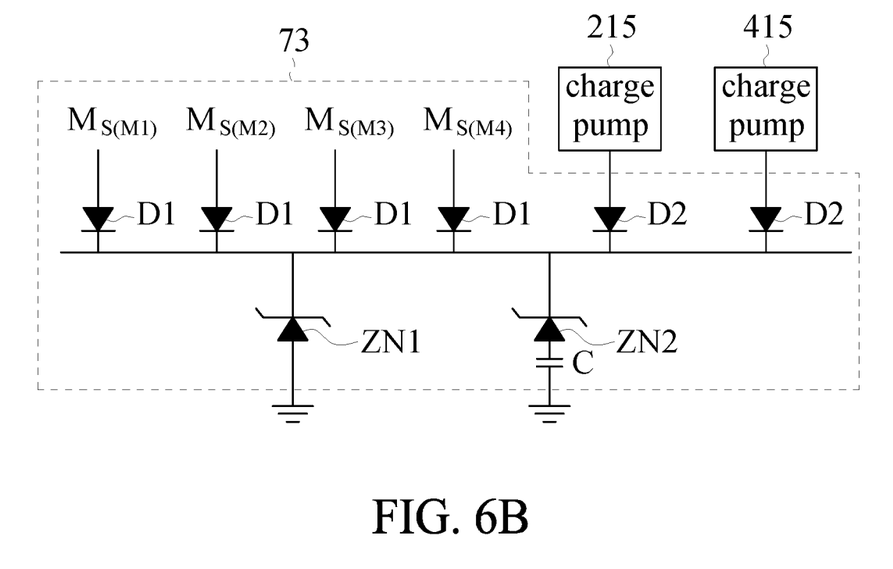
FIG. 6B is a circuit diagram of the system clamping circuit in FIG. 4B in another embodiment.

Referring to FIG. 6B, FIG. 6B is a circuit diagram of the system clamping circuit in FIG. 4B according to another embodiment of the present disclosure. The system clamping circuit 73 operates in the same way as the system clamping circuit 63 except that the system clamping circuit 73 comprises diodes D1 and diodes D2 which are connected to the control signals and the sources of NMOS transistors M, respectively, to provide over-voltage protection to input pins.

While the present disclosure has been described by means of specific embodiments, numerous modifications and variations could be made thereto by those skilled in the art without departing from the scope and spirit of the present disclosure set forth in the claims.

What is claimed is:

1. An over-voltage protection circuit for a USB Type-C connector USB Type-C connector having at least one input signal pin, the over-voltage protection circuit comprising:
   a control circuit for generating a control signal according to a bias signal;
   a voltage level shift circuit electrically connected to the at least one input signal pin and the control circuit to receive the control signal and an input signal from the at least one input signal pin and regulate a voltage level of the input signal according to the control signal; and
   a system clamping circuit electrically connected to the voltage level shift circuit to receive the regulated input signal and the control signal and clamp down voltage levels of the regulated the input signal and the control signal to below a threshold.

2. The over-voltage protection circuit of claim 1, wherein the control circuit comprises:
   a charge pump coupled to the voltage level shift circuit to receive the bias signal and output the control signal according to the bias signal.

3. The over-voltage protection circuit of claim 1, wherein the voltage level shift circuit comprises:
   at least one pair of NMOS transistors having a first NMOS transistor and a second NMOS transistor, the first NMOS transistor having a first gate terminal, a first drain terminal and a first source terminal, the second NMOS transistor having a second gate terminal, a second drain terminal and a second source terminal, wherein the first gate terminal and the second gate terminal are coupled to the control circuit to receive the control signal, the first drain terminal being electrically connected to one of the at least one input signal pin, the input signal pin corresponding to the input signal so as to receive the input signal, the first source terminal being connected to the second source terminal in series, and the second drain terminal being electrically connected to the system clamping circuit.

4. The over-voltage protection circuit of claim 1, wherein the voltage level shift circuit comprises:
   at least one NMOS transistor each having a gate terminal, a drain terminal and a source terminal, the gate terminal being coupled to the control circuit to receive the control signal, the drain terminal being electrically connected to one of the at least one input signal pin, the input signal pin corresponding to the input signal, so as to receive the input signal, and the source terminal being electrically connected to the system clamping circuit.

5. The over-voltage protection circuit of claim 4, wherein the system clamping circuit comprises:
   a first Zener diode having an anode and a cathode, the anode of the first Zener diode being grounded;
   at least one first diode each having an anode and a cathode, the anode of the at least one first diode being electrically connected to the source terminal of the at least one NMOS transistor, and the cathode of the at least one first diode being electrically connected to the cathode of the first Zener diode; and
   a second diode having an anode and a cathode, the anode of the second diode being electrically connected to the control circuit, and the cathode of the second diode being electrically connected to the cathode of the first Zener diode.

6. The over-voltage protection circuit of claim 5, wherein the system clamping circuit comprises:
   a second Zener diode having an anode and a cathode, the cathode of the second Zener diode being electrically connected to the cathode of the second diode, and the anode of the second Zener diode being electrically connected to ground through a capacitor, wherein the first Zener diode and the second Zener diode have different reverse breakdown voltages.

* * * * *